(12) United States Patent
Seki (10) Patent No.: US 8,550,637 B2
(45) Date of Patent: Oct. 8, 2013

(54) PROJECTOR WITH ADJUSTING FEET FOR FACILITATING OPERATION

(75) Inventor: Shigeyuki Seki, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 264 days.

(21) Appl. No.: 12/877,172

(22) Filed: Sep. 8, 2010

(65) Prior Publication Data

US 2011/0095663 A1 Apr. 28, 2011

(30) Foreign Application Priority Data

Oct. 23, 2009 (JP) ................................. 2009-244432

(51) Int. Cl.
G03B 21/14 (2006.01)

(52) U.S. Cl.
USPC .......... 353/119; 353/70; 353/122; 248/188.2; 312/223.2

(58) Field of Classification Search
USPC ............. 353/70, 119, 122; 248/188.2, 188.3, 248/188.5, 371, 372.1, 395, 292.12; 312/223.1, 312/223.2, 223.3
See application file for complete search history.

(56) References Cited

U.S. PATENT DOCUMENTS

| | | | | |
|---|---|---|---|---|
| 6,461,002 B1 * | 10/2002 | Su | .................................. | 353/119 |
| 6,604,831 B1 * | 8/2003 | Prestigomo et al. | .......... | 353/119 |
| 6,793,348 B2 * | 9/2004 | Lee et al. | ....................... | 353/119 |
| 6,796,538 B2 * | 9/2004 | Hsu et al. | .................... | 248/188.2 |
| 6,923,417 B2 * | 8/2005 | Chang | ............................. | 248/649 |
| 7,090,360 B2 * | 8/2006 | Kuroda et al. | ................. | 353/119 |
| 7,318,570 B2 * | 1/2008 | Lin et al. | ..................... | 248/188.2 |
| 7,901,091 B2 * | 3/2011 | Chen et al. | ..................... | 353/119 |
| 2002/0140909 A1 * | 10/2002 | Tanaka | ............................. | 353/70 |
| 2004/0150800 A1 * | 8/2004 | Uehara et al. | .................. | 353/119 |
| 2004/0263805 A1 * | 12/2004 | Rogers et al. | ................. | 353/119 |
| 2009/0122280 A1 * | 5/2009 | Kuroda | ............................ | 353/119 |
| 2009/0244500 A1 * | 10/2009 | Takara | ............................ | 353/119 |

FOREIGN PATENT DOCUMENTS

| | | |
|---|---|---|
| CN | 201097087 Y | 8/2008 |
| JP | U-3-1562 | 1/1991 |
| JP | A-2005-344813 | 12/2001 |
| JP | A-2006-276189 | 10/2006 |
| JP | A-2009-69461 | 4/2009 |

* cited by examiner

Primary Examiner — Georgia Y Epps
Assistant Examiner — Sultan Chowdhury
(74) Attorney, Agent, or Firm — Oliff & Berridge, PLC (57) ABSTRACT

A projector includes: an outer housing which forms an external case; and a foot attached to the outer housing and brought into contact with an installation surface when the projector is placed on the installation surface, wherein the foot includes a foot main body which contacts the installation surface, and a rotational member supported rotatably with respect to the outer housing in such a condition that at least a part of the rotational member is exposed to the outside of the outer housing, and the foot main body engages with the rotational member and shifts in the direction along a rotation axis of the rotational member in accordance with rotation of the rotational member.

10 Claims, 9 Drawing Sheets

PROJECTOR WITH ADJUSTING FEET FOR FACILITATING OPERATION

BACKGROUND

1. Technical Field

The present invention relates to a projector.

2. Related Art

A projector of a type having feet (feet units) on the bottom surface of its outer housing is known. These feet come into contact with an installation surface such as a desk when the projector is placed on the installation surface (for example, see JP-A-2006-276189).

According to the technology disclosed in JP-A-2006-276189, the feet are made rotatable with respect to the outer housing by using a screw mechanism so as to change the length of projection of the feet from the bottom surface of the outer housing by rotation of the feet.

At the time of using the projector, a user varies the position of the projector placed on the installation surface by rotating the feet for changing the length of projection from the bottom surface of the outer housing, and allows the projector to project an image at an appropriate position on a screen.

According to the projector shown in JP-A-2006-276189, however, the operation position of the feet for changing the position of the projector is disposed between the installation surface and the bottom surface of the outer housing. This structure makes it difficult to operate the feet, and lowers the degree of convenience of the projector.

SUMMARY

An advantage of some aspects of the invention is to provide a projector which increases the degree of its convenience by facilitating operation for adjusting feet of the projector.

According to an aspect of the invention, a projector including: an outer housing which forms an external case; and a foot attached to the outer housing and brought into contact with an installation surface when the projector is placed on the installation surface. The foot includes a foot main body which contacts the installation surface, and a rotational member supported rotatably with respect to the outer housing in such a condition that at least a part of the rotational member is exposed to the outside of the outer housing. The foot main body engages with the rotational member and shifts in the direction along a rotation axis of the rotational member in accordance with rotation of the rotational member.

The rotational member is disposed at the following positions, for example.

The rotational member is attached to the outside surface of the outer housing.

The rotational member is disposed inside the outer housing and exposed to the outside through an opening formed on the outer housing.

According to this aspect of the invention, the foot includes the rotational member rotated by a user and the foot main body which contacts the installation surface such as a desk and changes the length of projection from the outside surface of the outer housing according to the rotation of the rotational member.

According to this structure, the user can vary the length of projection of the foot main body from the outside surface of the outer housing by rotating the rotational member disposed at the various positions described above so as to change the position of the projector. That is, the user can locate the operation position of the foot (position of the rotational member) at an arbitrary position. Accordingly, the degree of convenience of the projector increases by easier operation of the foot.

According to the projector of this aspect, it is preferable that the projector further includes a rotation restricting member which contacts the outer surface of the foot main body and restricts the rotation of the foot main body in the same direction as that of the rotation of the rotational member.

When the rotational member is rotated, there is a possibility that the foot main body is rotated in the same direction by the rotation of the rotational member.

When the foot main body is rotated in this manner for changing the position of the projector placed on the installation surface, the projector shifts from the installation surface in the front-rear or left-right direction due to the frictional force produced between the foot main body and the installation surface. That is, the position of the projection image projected on a screen shifts.

According to this structure, the projector includes the rotation restricting member for restricting the rotation of the foot main body.

In this case, the foot main body contacting the installation surface does not rotate with the rotational member even when the rotational member of the projector placed on the installation surface is rotated. Thus, the projector does not shift from the installation surface in the front-rear or left-right direction, thereby preventing the positional shift of the projection image.

According to the projector of this aspect, it is preferable that the outer housing has a notch extending to side surfaces disposed adjacent to each other, and that the rotational member is exposed to the outside of the outer housing through the notch.

According to this structure, the rotational member is exposed to the outside of the outer housing through the notch extending to the respective side surfaces adjacent to each other.

In this case, the area of the rotational member exposed to the outside increases, and thus the user can easily hold the rotational member. Accordingly, the degree of convenience further increases by further easier operation of the foot.

According to the projector of this aspect, it is preferable that the rotational member has a substantially cylindrical large-diameter portion exposed to the outside of the outer housing, and a substantially cylindrical small-diameter portion having a smaller diameter than that of the large-diameter portion. The small-diameter portion projects from the end surface on the opposite side to the installation surface of the large-diameter portion. The outer housing has a rotation support portion which supports the rotational member. The rotation support portion has an insertion concave concaved toward the inside of the outer housing in the shift direction of the foot main body as a portion into which the small-diameter portion is inserted.

According to this structure, the rotational member has the substantially cylindrical large diameter portion and small-diameter portion having different diameters. The rotation support portion provided on the outer housing has the insertion concave into which the small-diameter portion is inserted. Thus, the rotation support portion supports the side surface of the small-diameter portion by the inner surface of the insertion concave by the engagement between the stepped portion formed by the large-diameter portion and the small-diameter portion and the opening end of the insertion concave while receiving a force produced by the weight of the projector and applied from the installation surface to the foot.

In this case, the rotational member can be smoothly rotated while preventing shift of the rotational member from the rotation support portion even when the rotational member of the projector placed on the installation surface is rotated. That is, the positional shift of the rotational member from the rotation support portion is prevented, and thus the positional shift of the foot main body is avoided. Accordingly, the projector does not shift from the installation surface in the front-rear or left-right direction even when the rotational member of the projector placed on the installation surface is rotated. Thus, the positional shift of the projection image can be prevented.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment according to the invention is hereinafter described with reference to the drawings.

Structure of External Appearance

Figure 1:
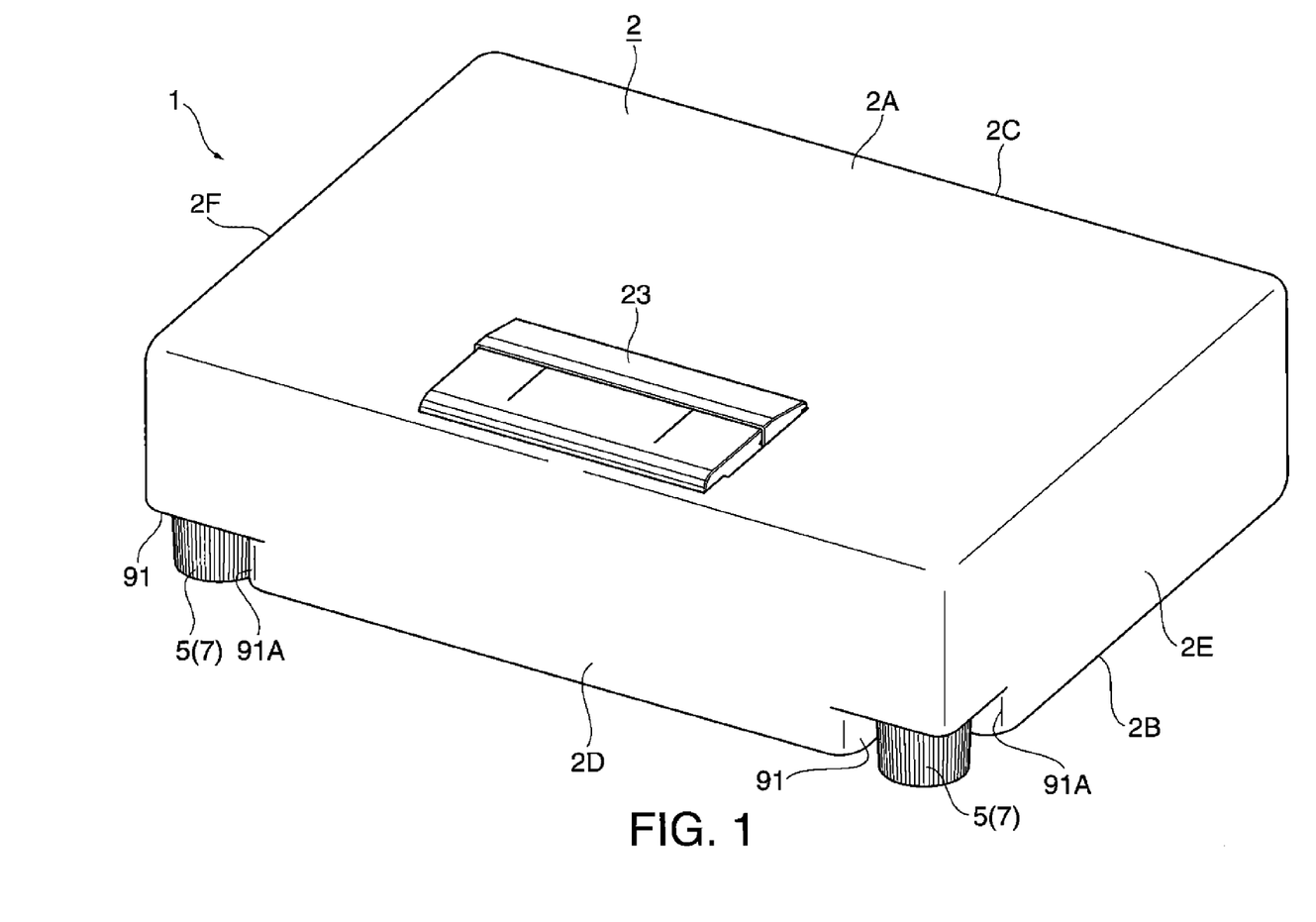
FIG. 1 schematically illustrates the general structure of a projector according to an embodiment.
Figure 2:
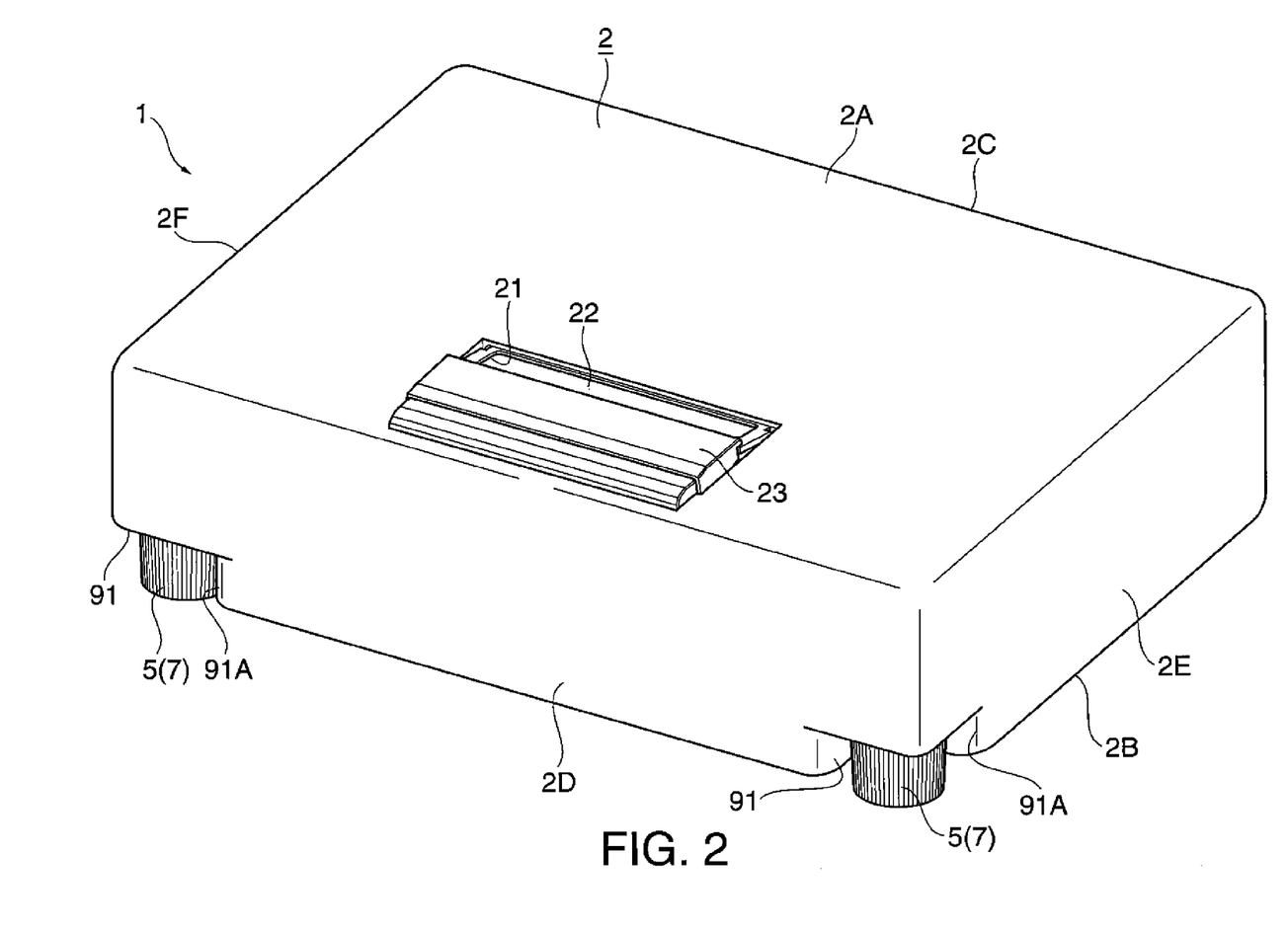
FIG. 2 schematically illustrates the general structure of the projector according to the embodiment.

FIGS. 1 and 2 schematically illustrate the general structure of a projector 1. More specifically, FIG. 1 is a perspective view illustrating the projector 1 on the back surface side in a condition where a protection cover 23 is located at a closing position as viewed from above, and FIG. 2 is a perspective view illustrating the projector 1 on the back surface side in a condition where the protection cover 23 is located at a non-closing position as viewed from above.

The "upper" and "lower" directions described herein correspond to the upper and lower directions as viewed in FIGS. 1 and 2. For convenience of the explanation, the image projection side is referred to as the front surface side (the back side in FIGS. 1 and 2), and the side opposite to the image projection side is referred to as the back surface side (the front side in FIGS. 1 and 2).

The projector 1 forms images by modulating light emitted from a light source according to image information, and expands and projects the formed images on a screen (not shown).

The projector 1 in this embodiment projects the expanded images from the top surface toward above on the front surface side, the details of which will be described later.

As illustrated in FIGS. 1 and 2, the projector 1 includes an outer housing 2 constituting an external case.

Figure 3:
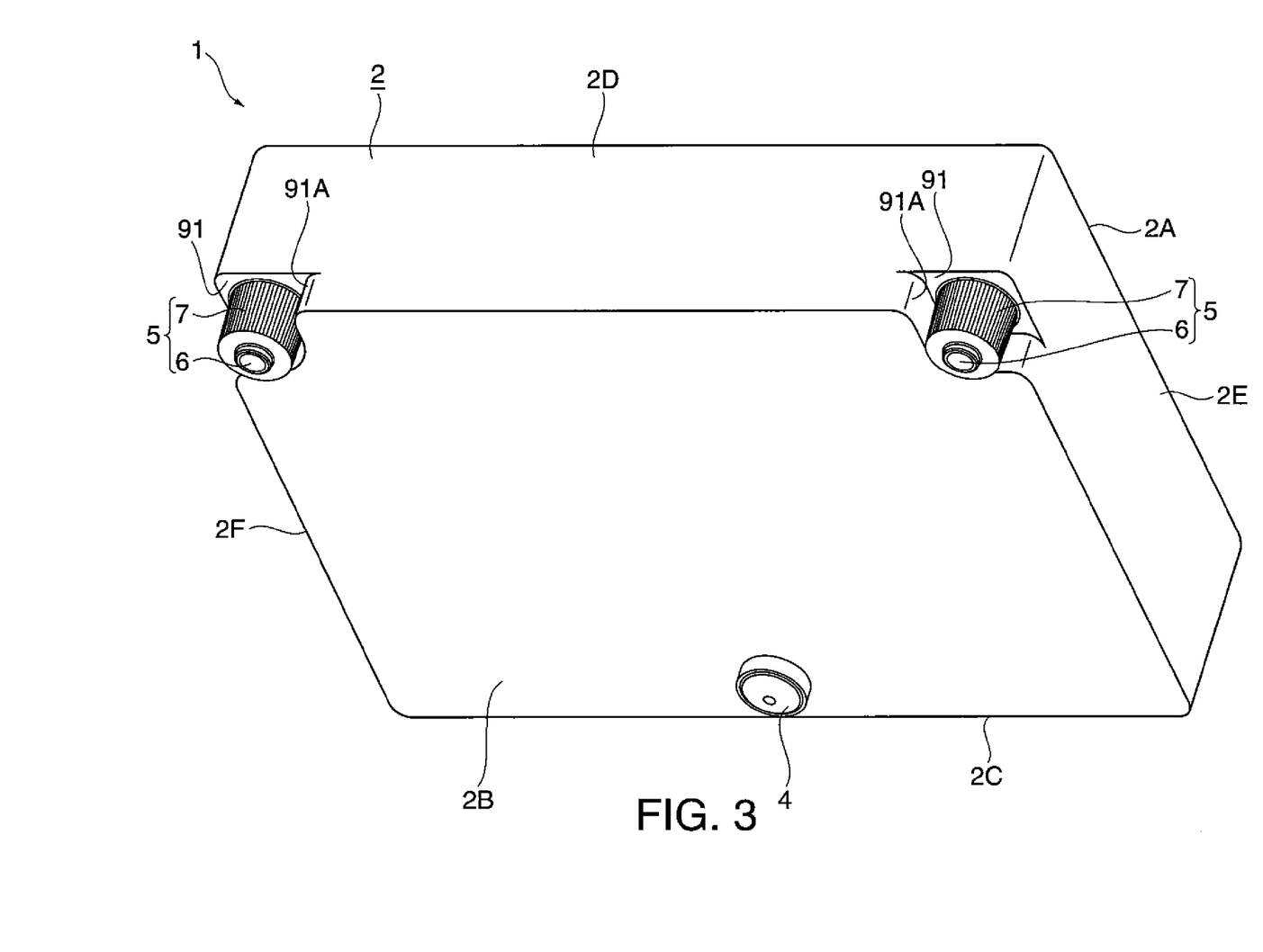
FIG. 3 is a perspective view of an outer housing on the back surface side as viewed from below according to the embodiment.

FIG. 3 is a perspective view of the outer housing 2 on the back surface side as viewed from below.

The outer housing 2 accommodates a device main body including an optical unit 3 (described later, see FIG. 4) and the like of the projector 1. As illustrated in FIGS. 1 through 3, the outer housing 2 has a top surface 2A positioned on the upper side, a bottom surface 2B positioned on the lower side and opposed to the top surface 2A, and side surfaces 2C through 2F connecting the top surface 2A and the bottom surface 2B to form a substantially rectangular parallelepiped shape.

As illustrated in FIG. 2, a light pass opening is formed on the top surface 2A on the back surface side substantially at the center in the left-right direction such that images can pass through the light pass opening 21.

As can be seen from FIG. 2, the light pass opening 21 is closed by a light-transmissive member 22 made of material capable of transmitting light.

As illustrated in FIGS. 1 and 2, the protection cover 23 which shifts in the front-rear direction to be located at the closing position for covering the light-transmissive member 22 (FIG. 1) and the non-closing position for exposing the light-transmissive member 22 (FIG. 2) is attached to the periphery of the light pass opening 21 on the top surface 2A.

As illustrated in FIG. 3, a fixing foot 4 which comes into contact with an installation surface such as a desk when the projector 1 is placed on the installation surface is provided on the bottom surface 2B on the front side substantially at the center in the left-right direction.

Similarly, as illustrated in FIG. 3, feet 5 which come into contact with the installation surface such as a desk when the projector 1 is placed on the installation surface are provided at the left and right corners of the bottom surface 2B on the back surface side.

The feet 5 are constructed such that the lengths of projection of the feet 5 from the bottom surface 2B are adjustable. The feet 5 vary the position of the projector 1 placed on the installation surface to change the position of a projection image projected on the screen by controlling the lengths of projection of the feet 5.

The detailed structure of the feet 5 and supporting mechanisms 8 for supporting the feet 5 (see FIGS. 5 and 6) will be described later.

Internal Structure

Figure 4:
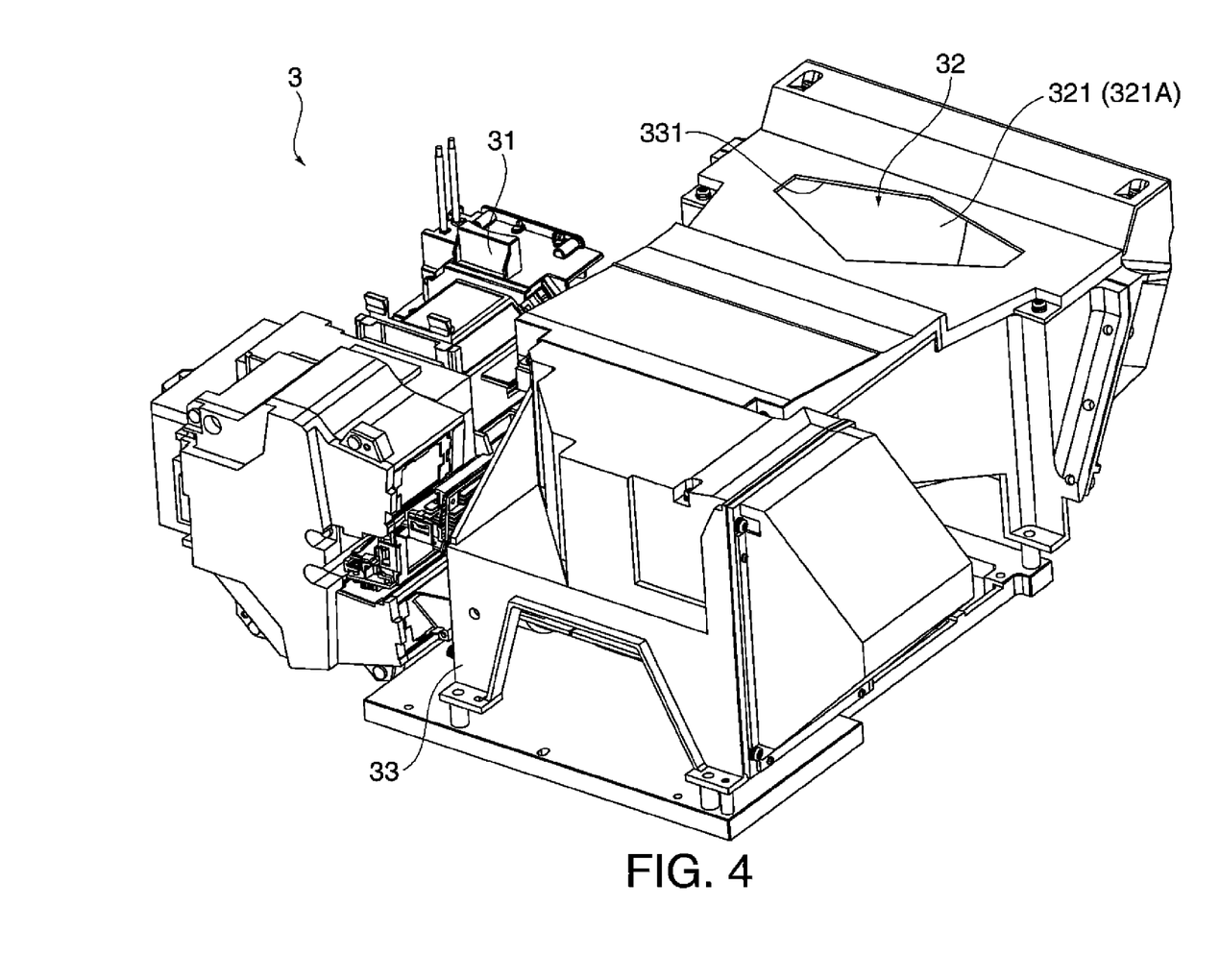
FIG. 4 is a perspective view of an optical unit on the front surface side as viewed from above according to the embodiment.

FIG. 4 is a perspective view of the optical unit 3 on the front surface side as viewed from above.

The outer housing 2 accommodates the optical unit 3 shown in FIG. 4.

As illustrated in FIG. 4, the optical unit 3 includes a light source device 31, a light modulation device such as a liquid crystal panel (not shown) which forms an image by modulating light emitted from the light source device 31 according to image information, a projection device 32 which expands the image formed by the light modulation device and projects the expanded image toward the screen (not shown), an optical component housing 33 which accommodates these components, and others.

The projection device 32 projects the image formed by the light modulation device through an opening 331 (FIG. 4) formed on the optical component housing 33 and the light pass opening 21 (the light-transmissive member 22) with a short focus and a wide angle. The projection device 32 has an aspherical mirror 321 as illustrated in FIG. 4.

The aspherical mirror 321 includes a rotationally asymmetric and freely curved reflection surface 321A. The aspherical mirror 321 has the reflection surface 321A facing upward toward the front surface side at the final area on the optical path of the projection device 32 such that the image supplied from the front surface side to the back surface side can be reflected upward toward the front surface side as a wide angle image via a plurality of lenses and the like (not shown) constituting the projection device 32.

The projection device 32 allows the projector 1 to be disposed at a position close to the screen (not shown), and thus increases the degree of freedom for installation of the projector 1. More specifically, since the projector 1 is allowed to be disposed at a position closer to the wall surface to which the screen is attached, the possibility that light traveling from the screen toward an observer is blocked by the projector 1 can be securely eliminated. Accordingly, a comfortable condition for image observation can be produced.

In this embodiment, the projector 1 can be disposed at a position shifted from the screen only by about 550 mm for use, for example.

Structure of Feet

Figure 5:
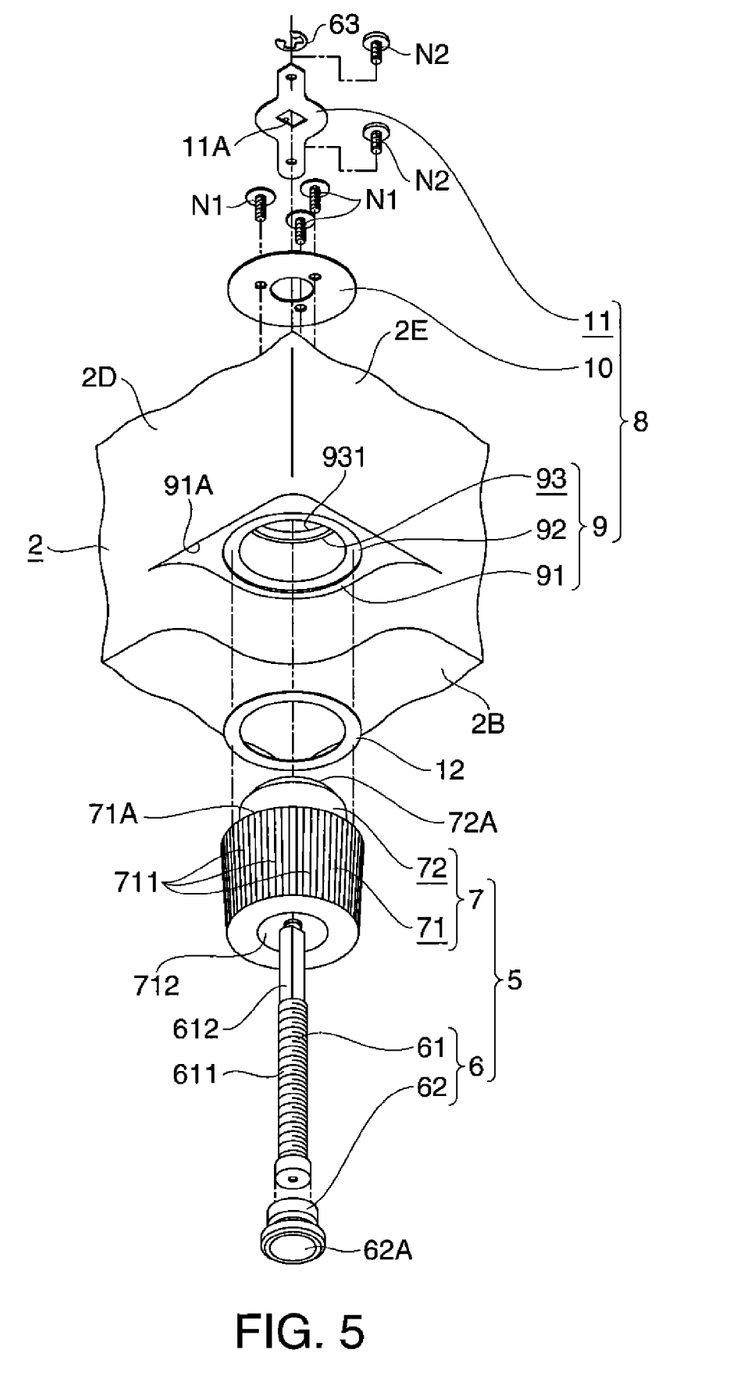
FIG. 5 illustrates the structures of a foot and a support mechanism according to the embodiment.
Figure 6:
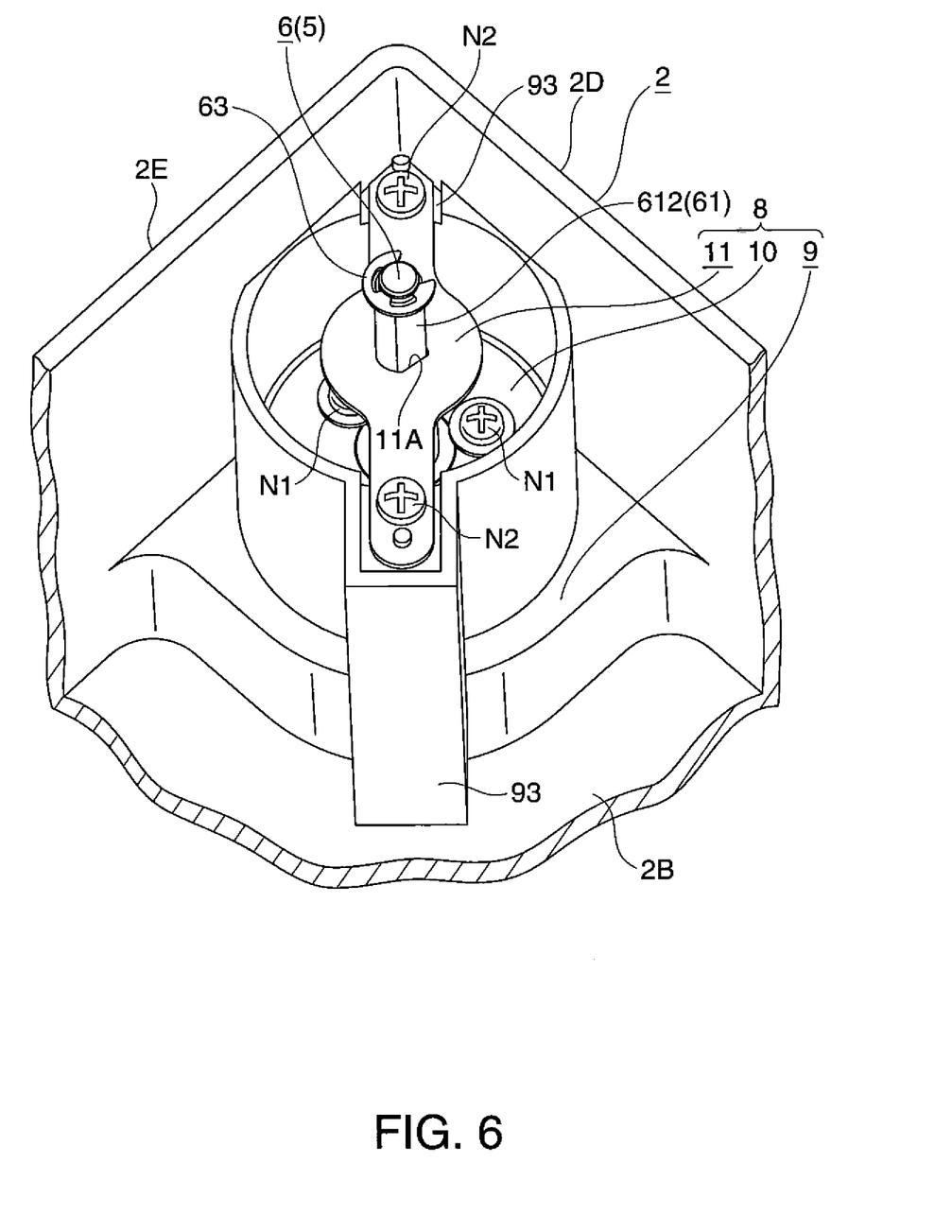
FIG. 6 illustrates the structures of the foot and the support mechanism according to the embodiment.

FIGS. 5 and 6 show the structures of one of the feet 5 and one of the supporting mechanisms 8. More specifically, FIG. 5 is a perspective view of the foot 5 and the supporting mechanism 8 in the disassembled condition as viewed from below. FIG. 6 is a perspective view of the foot 5 and the supporting mechanism as viewed from the inside of the outer housing 2.

Since the two feet 5 have the same structure, only the foot 5 positioned on the right side as viewed from the back surface is herein explained. This applies to the supporting mechanisms 8.

As can be seen from FIGS. 5 and 6, the foot 5 has a foot main body 6 and a rotational member 7 (FIG. 5).

The foot main body 6 is a component which comes into contact with the installation surface such as a desk. As illustrated in FIGS. 5 and 6, the foot main body 6 has a cylindrical bar-shaped member 61 extending in the up-down direction, and a contacting member 62 attached to the lower end of the bar-shaped member 61.

As can be seen from FIG. 5, screw grooves 611 for engaging with the rotational member 7 are formed on the outer surface of the bar-shaped member 61.

In this embodiment, the screw grooves 611 are formed under a so-called "fine pitch thread" with a small pitch.

As illustrated in FIGS. 5 and 6, a restricting portion 612 is provided on the bar-shaped member 61 on the upper end side. The restricting portion 612 has a cross-sectional area smaller than that of the bar-shaped member 61 on the lower end side where the screw grooves 611 are formed, and has a substantially rectangular cross-sectional shape.

The contacting member 62 is a component in contact with the installation surface such as a desk, and has a cross-sectional area larger than that of the lower end of the bar-shaped member 61.

In this embodiment, a hemispherical elastic member 62A made of rubber or the like is attached to the lower end of the contacting member 62 as shown in FIG. 5.

Figure 7:
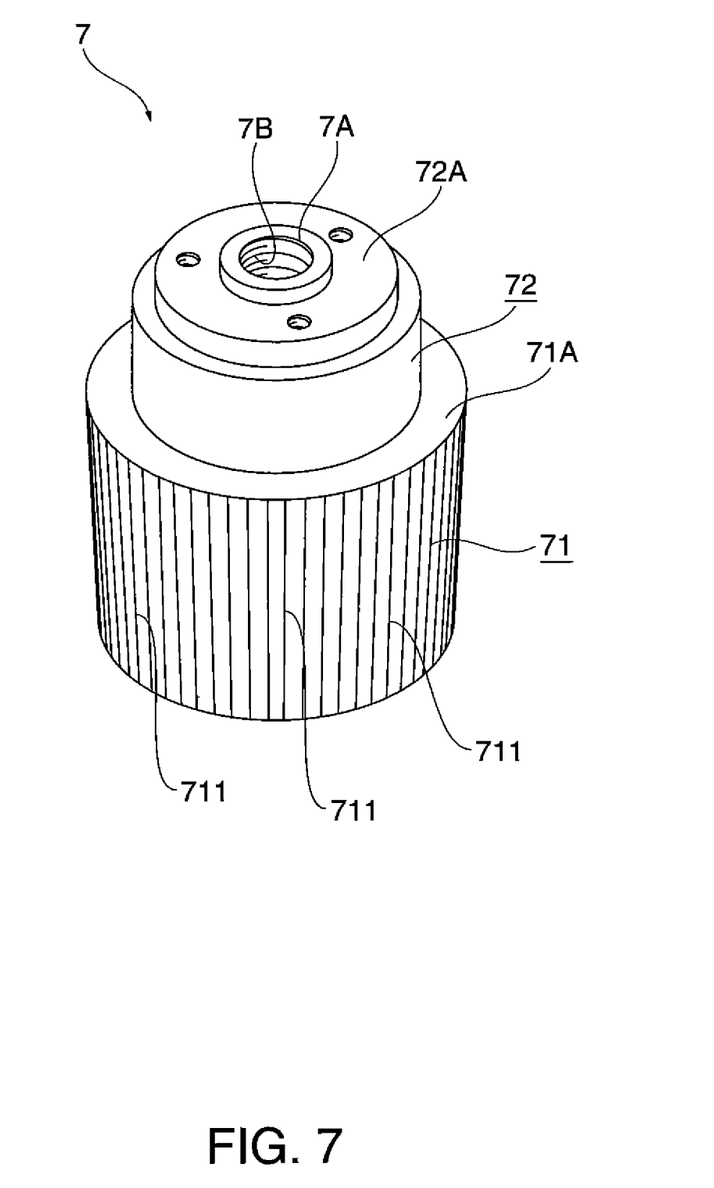
FIG. 7 is a perspective view of a rotational member as viewed from above according to the embodiment.

FIG. 7 is a perspective view of the rotational member 7 as viewed from above.

The rotational member 7 is operated by the user when the position of the projector 1 is desired to be changed. The rotational member 7 is supported by the supporting mechanism 8 in such a manner as to be rotatable with respect to the outer housing 2 around a rotation axis Ax (see FIG. 8) extending substantially perpendicular to the bottom surface 2B.

As illustrated in FIGS. 5 and 7, the rotational member 7 generally has a substantially cylindrical shape having an insertion hole 7A (FIG. 7) through which the bar-shaped member 61 is inserted.

More specifically, the rotational member 7 has substantially cylindrical large-diameter portion 71 and small-diameter portion 72 having different diameters and formed integrally with each other and coaxially around the rotation axis Ax to form a stepped outer surface.

As illustrated in FIG. 7, screw grooves 7B are formed on the inner wall of the insertion hole 7A.

The bar-shaped member 61 (the screw grooves 611) engages with the insertion hole 7A (the screw grooves 7B). The foot main body 6 is supported by the rotational member 7 through this engagement.

The large-diameter portion 71 is exposed to the outside of the outer housing 2 to be operated by the user.

As illustrated in FIGS. 5 and 7, a plurality of linear projections 711 extending substantially in parallel with the rotation axis Ax are formed throughout the side surface of the large-diameter portion 71 such that the large-diameter portion 71 can be easily operated by the user.

As illustrated in FIG. 5, an accommodating concave 712 is formed on the lower end surface of the large-diameter portion 71. The accommodating concave 712 is concaved upward to communicate with the insertion hole 7A.

The accommodating concave 712 accommodates the contacting member 62 attached to the lower end of the bar-shaped member 61.

As illustrated in FIGS. 5 and 7, the small-diameter portion 72 is provided on an upper surface 71A of the large-diameter portion 71. The small-diameter portion 72 has a diameter smaller than that of the large-diameter portion 71.

Structure of Supporting Mechanism

As illustrated in FIGS. 5 and 6, the supporting mechanism 8 has a rotation support portion 9, a plate 10, and a rotation restricting member 11.

As can be seen from FIGS. 5 and 6, the rotation support portion 9 is disposed at each of the left and right corners of the outer housing 2 on the back surface side.

As illustrated in FIG. 5, the rotation support portion 9 has an exposing concave 91 concaved upward from the bottom surface 2B, an intermediate concave 92 further concaved upward from the bottom of the exposing concave 91, and an insertion concave 93 further concaved upward from the bottom of the intermediate concave 92.

The exposing concave 91 having a circular cross-sectional shape is a portion where the large-diameter portion 71 of the rotational member 7 is disposed.

As illustrated in FIG. 5, the outer housing 2 has a notch 91A extending to the side surface 2D and the side surface 2E (side surface 2F) adjacent to each other and communicating with the exposing concave 91.

Thus, a part of the large-diameter portion 71 disposed on the exposing concave 91 is exposed from the side surfaces 2D and 2E to the outside through the notch 91A.

The intermediate concave 92 having a circular cross-sectional shape is a portion where a sliding contact plate 12 (FIG. 5) is disposed.

As illustrated in FIG. 5, the sliding contact plate 12 has a circular frame-shaped plate body through which the small-diameter portion 72 is inserted, and has a function of reducing friction produced between the upper surface 71A of the large-diameter portion 71 and the rotation support portion 9 (bottom of the exposing concave 91) during rotation of the rotational member 7.

The sliding contact plate 12 is formed by resin sheet made of PET (polyethylene terephthalate), Teflon (trademark), nylon or the like, a sheet member containing lubricant, for example.

The insertion concave 93 having a circular cross-sectional shape and substantially the same diameter as that of the small-diameter portion 72 is a portion into which the small-diameter portion 72 is inserted.

As illustrated in FIG. 5, a circular communicating hole 931 which functions both as a hole into which the foot main body 6 is inserted and as a hole communicating with the inside of the outer housing 2 is formed on the bottom of the insertion concave 93.

The plate 10 disposed inside the outer housing 2 is a member used for attachment of the foot 5 to the rotation support portion 9.

The plate 10 is a circular-frame-shaped plate having an outside diameter larger than that of the communicating hole 931. The plate 10 into which the foot main body 6 is inserted is fixed to an upper surface 72A of the small-diameter portion 72 (FIGS. 5 and 7) by screws N1 threaded from the inside of the outer housing 2 (FIGS. 5 and 6).

According to this structure, the upward shift of the rotational member 7 is restricted by the engagement between the upper surface 71A of the large-diameter portion 71 and the bottoms of the exposing concave 91 and the intermediate concave 92. The downward shift of the rotational member 7 is restricted by the engagement between the plate 10 and the periphery of the communicating hole 931. By this method, the rotational member 7 is attached to the rotation support portion 9 rotatably around the rotation axis Ax in such a condition that the upward and downward shifts of the rotational member 7 are restricted in the manner described above.

As illustrated in FIGS. 5 and 6, the rotation restricting member 11 has a plate body having an insertion hole 11A through which the upper end of the bar-shaped member 61 is inserted, and is fixed to a fixing portion 93 (FIG. 6) projecting from the bottom surface 2B by screws N2.

The insertion hole 11A has a shape substantially same as the outer shape of the restricting portion 612 of the bar-shaped member 61. Thus, the rotation restricting member 11 has a function of restricting rotation of the foot main body 6 around the rotation axis Ax while allowing shift of the foot main body 6 along the rotation axis Ax.

Operation of Foot

The operation of the foot 5 is now described.

Figure 8:
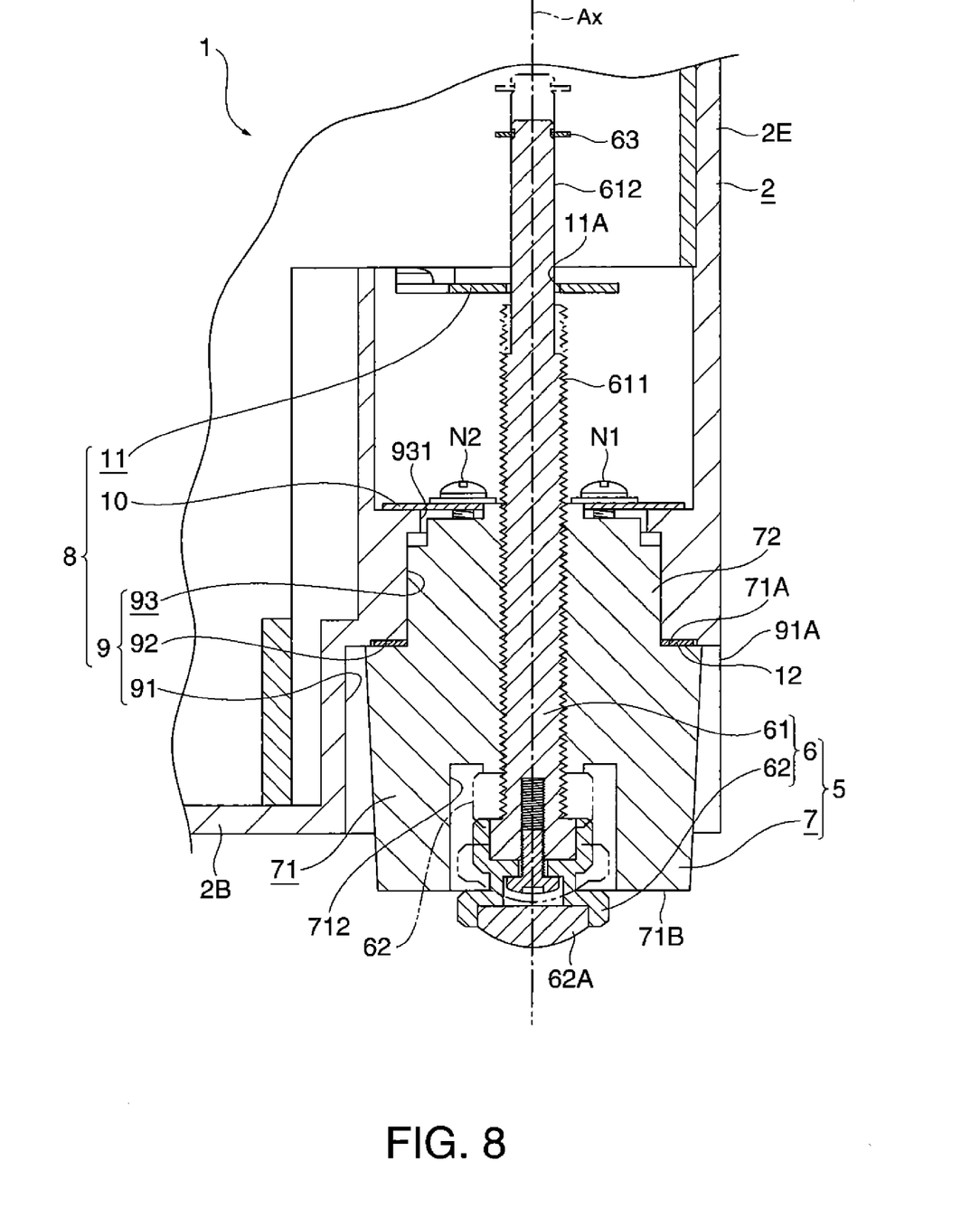
FIG. 8 is a cross-sectional view illustrating the operation of the foot according to the embodiment.

FIG. 8 is a cross-sectional view for explaining the operation of the foot 5.

For example, the user performs the following procedures for changing the position of the projector 1.

The user holds the side surface of the large-diameter portion 71 exposed to the outside through the notch 91A, and presses the side surface of the large-diameter portion 71 in the rotational direction around the rotation axis Ax.

As a result, the rotational member 7 rotates around the rotational axis Ax along with the plate 10 with the upper surface 71A of the large-diameter portion 71 and the plate 10 slidingly contacting the peripheries of the sliding contact plate 12 and the communicating hole 931, respectively.

The foot main body 6 shifts along the rotation axis Ax by the change of the engagement between the foot main body 6 and the rotational member 7 in accordance with the rotation of the rotational member 7.

Since the rotation of the foot main body 6 around the rotation axis Ax is restricted by the rotation restricting member 11, the foot main body 6 shifts only in the direction along the rotation axis Ax without being rotated by the rotation of the rotational member 7.

For example, when the rotational member 7 is rotated such that the foot main body 6 shifts downward, the length of projection of the foot main body 6 from the bottom surface 2B gradually increases, that is, the height of the projector 1 on the back surface side relative to the height on the front surface side gradually increases. As a result, the position of the projector 1 becomes inclined to the installation surface such as a desk.

As illustrated in FIGS. 5, 6, and 8, a separation preventing ring 63 having an external shape larger than that of the insertion hole 11A of the rotation restricting member 11 is attached to the upper end of the bar-shaped member 61. Thus, even when the rotation of the rotational member 7 is continued in this manner, separation of the foot main body 6 toward the outside of the outer housing 2 is prevented by the engagement between the ring 63 and the periphery of the insertion hole 11A.

On the other hand, when the rotational member 7 is rotated such that the foot main body 6 shifts upward, for example, the length of projection of the foot main body 6 from the bottom surface 2B gradually decreases, that is, the height of the projector 1 on the back surface side relative to the height on the front surface side gradually decreases. As a result, the position of the projector 1 comes to be substantially parallel with the installation surface such as a desk.

When the rotation of the rotational member 7 is continued in this manner, the contacting member 62 contacts the bottom of the accommodating concave 712 as indicated by alternate long and two short dashes lines in FIG. 8. Thus, the upward shift of the foot main body 6 is restricted, that is, the rotation of the rotational member 7 in this direction is restricted.

As explained above, in the foot 5, a part of the elastic member 62A attached to the lower end of the contacting member 62 projects downward from a lower surface 71B (FIG. 8) of the large-diameter portion 71 under the condition in which the contacting member 62 is accommodated in the accommodating concave 712.

Thus, in the foot 5, even when the foot main body 6 shifts to the uppermost position, the elastic member 62A contacts the installation surface such as a desk without contact between the lower surface 71B of the large-diameter portion 71 and the installation surface such as a desk. By this method, rotation of the rotational member 7 can be facilitated.

According to this embodiment, the following advantages are offered.

In this embodiment, each of the feet 5 has the rotational member 7 rotated by the user, and the foot main body 6 contacting the installation surface and changing the length of projection from the bottom surface 2B in accordance with the rotation of the rotational member 7.

According to this structure, the user can vary the length of projection of the foot main body 6 from the bottom surface 2B by rotating the rotational member 7 which may be disposed at various positions so as to change the position of the projector 1. That is, the user can locate the operation position of the foot 5 (position of the rotational member 7) at an arbitrary position. Accordingly, the degree of convenience of the projector 1 increases by easier operation of the foot 5.

In this embodiment, particularly, the rotational member 7 is disposed on the exposing concave 91 such that the operation position of the foot 5 operated by the user can be positioned higher than the position of the bottom surface 2B on the flat plane. Moreover, the rotational member 7 disposed on the exposing concave 91 is exposed to the outside of the outer housing 2 via the notch 91A.

According to this structure, the user can rotate the rotational member 7 exposed from the side surfaces 2D and 2E (2F) without the necessity for inserting the fingers or the like into the space between the bottom surface 2B and the installation surface for rotating the rotational member 7. Thus, the degree of convenience increases by easiness in operating the foot 5.

The notch 91A extends to the side surface 2D and the side surface 2E (the side surface 2F) adjacent to each other.

According to this structure, the area of the rotational member 7 exposed to the outside increases, and thus the user can easily hold the rotational member 7. Accordingly, the degree of convenience further increases by further easier operation of the foot 5.

The projector 1 includes the rotation restricting member 11 restricting the rotation of the foot main body 6.

According to this structure, the foot main body contacting the installation surface does not rotate with the rotational member 7 even when the rotational member 7 of the projector 1 placed on the installation surface is rotated. Thus, the projector 1 does not shift from the installation surface in the front-rear or left-right direction, thereby preventing the positional shift of the projection image.

Particularly, in case of the projector 1 as the close-projection-type projector which projects images from a position close to the screen as in this embodiment, the projection image on the screen largely shifts even when the projector 1 only slightly shifts from the installation surface in the front-rear or left-right direction. However, the positional shift of the projection image can be appropriately prevented by incorporating the feet 5 to the close-projection-type projector 1 as in this embodiment.

The rotational member 7 has the substantially cylindrical large diameter portion 71 and small-diameter portion 72 having different diameters. The rotation support portion 9 has the insertion concave 93 into which the small-diameter portion 72 is inserted. Thus, the rotation support portion 9 supports the side surface of the small-diameter portion 72 by the inner surface of the insertion concave 93 by the engagement between the upper surface 71A of the large-diameter portion 71 and the opening end of the insertion concave 93 (bottoms of the exposing concave 91 and the intermediate concave 92) while receiving a force produced by the weight of the projector 1 and applied from the installation surface to the foot 5.

According to this structure, the rotational member 7 can be smoothly rotated while preventing shift of the rotational member 7 from the rotation support portion 9 even when the rotational member 7 of the projector 1 placed on the installation surface is rotated. That is, the positional shift of the rotational member 7 from the rotation support portion 9 is prevented, and thus the positional shift of the foot main body 6 is avoided. Accordingly, the projector 1 does not shift from the installation surface in the front-rear or left-right direction even when the rotational member 7 of the projector 1 placed on the installation surface is rotated. Thus, the positional shift of the projection image can be prevented.

The sliding contact plate 12 is provided between the upper surface 71A of the large-diameter portion 71 and the opening end of the insertion concave 93. Thus, friction generated between the upper surface 71A of the large-diameter portion 71 and the opening end of the insertion concave 93 can be reduced even when the force produced by the weight of the projector 1 is applied from the installation surface to the foot 5. Accordingly, the rotational member 7 can be smoothly rotated.

The screw structures of the foot main body 6 and the rotational member 7 (the screw grooves 611 and 7B) are formed under the fine pitch thread. Thus, the length of projection of the foot main body 6 from the bottom surface 2B can be finely adjusted according to the rotation of the rotational member 7. Accordingly, the position of the projector 1 can be finely controlled.

The invention is not limited to the embodiment described herein. It is therefore intended that modifications, improvements and others without departing from the scope of the invention are included in the invention.

Figure 9:
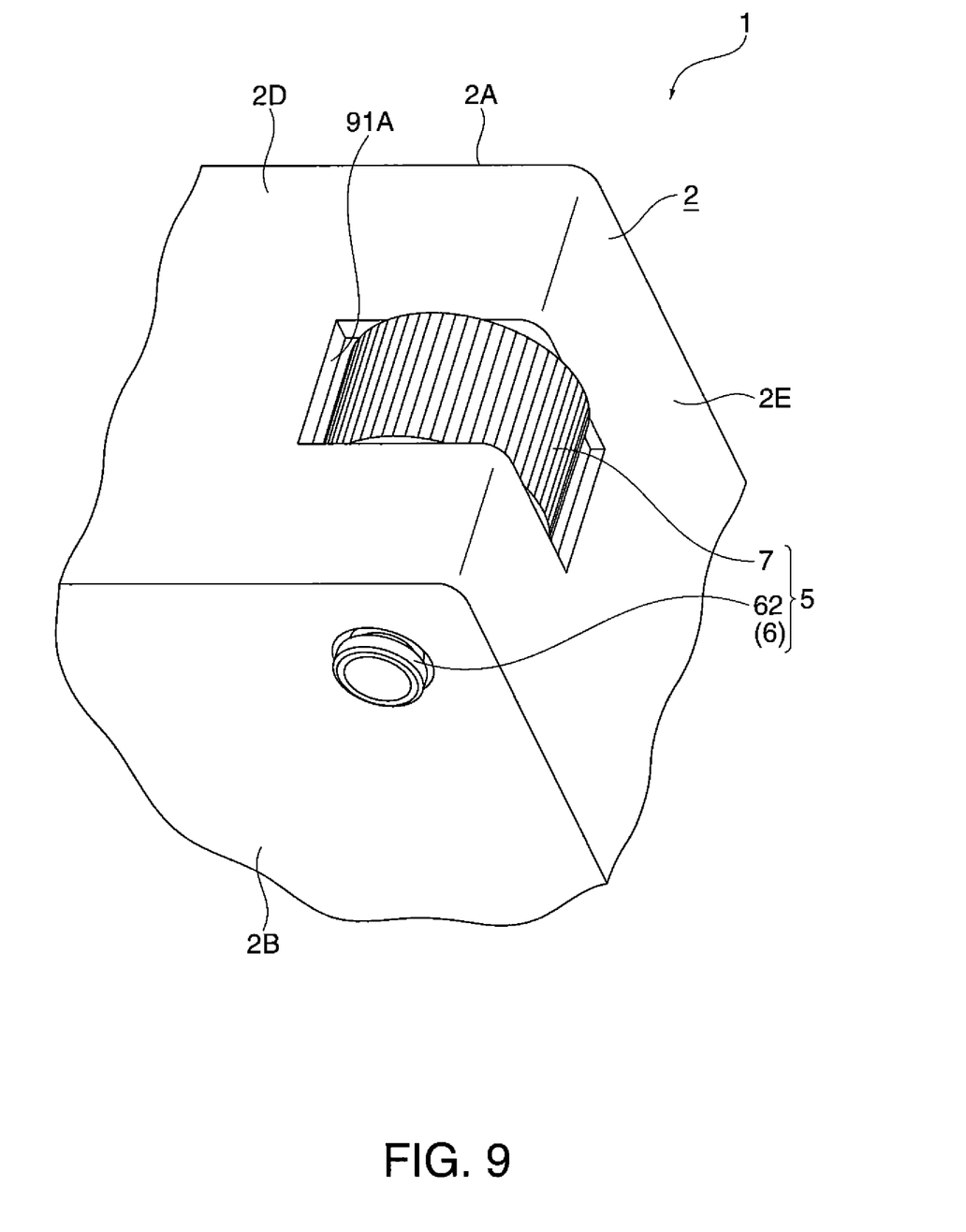
FIG. 9 illustrates a modified example of the embodiment.

FIG. 9 illustrates a modified example of the embodiment.

According to the embodiment, the rotational member 7 is disposed outside the outer housing 2 (on the exposing concave 91). However, the rotational member 7 may be disposed inside the outer housing 2 as illustrated in FIG. 9. In this case, the rotational member 7 is exposed to the outside through the notch 91A formed on the outer housing 2.

In case of the structure including the rotational member 7 disposed inside the outer housing 2, it is preferable that the notch 91A extends to the side surfaces 2D and 2E (2F) adjacent to each other similarly to the structure of the embodiment.

While the feet 5 are provided on the close-projection-type projector 1 which projects images from the top surface 2A toward above on the front surface side in the embodiment, the feet 5 may be equipped to an ordinary projector which projects images from the side surface 2C on the front side toward the front side surface.

The projector which increases the degree of convenience by facilitating operation of the foot according to the invention is applicable to a projector used for presentation, home theater or the like.

The present application claim priority from Japanese Patent Application No. 2009-244432 filed on Oct. 23, 2009, which is hereby incorporated by reference in its entirety.

What is claimed is:

1. A projector comprising:
    an outer housing which forms an external case; and
    a foot brought into contact with an installation surface when the projector is placed on the installation surface, wherein
    the foot includes a foot main body which contacts the installation surface, and a rotational member supported rotatably with respect to the outer housing in such a condition that at least a part of the rotational member is exposed to an outside of the outer housing,
    the foot main body engages with the rotational member and shifts in a direction along a rotation axis of the rotational member in accordance with rotation of the rotational member, and
    a rotation restricting member, disposed inside the outer housing, restricts rotation of the foot main body.

2. The projector according to claim 1, wherein
    the outer housing has a notch extending to side surfaces disposed adjacent to each other; and
    the rotational member is exposed to the outside of the outer housing through the notch.

3. The projector according to claim 1, wherein
    the rotational member has a substantially cylindrical large-diameter portion exposed to the outside of the outer housing, and a substantially cylindrical small-diameter portion having a smaller diameter than a diameter of the large-diameter portion, the small-diameter portion projecting from an end surface on an opposite side to the installation surface of the large-diameter portion, the outer housing has a rotation support portion which supports the rotational member; and the rotation support portion has an insertion concavity that is concave toward an inside of the outer housing in the shift direction of the foot main body as a portion into which the small-diameter portion is inserted.

4. The projector according to claim 2, wherein the rotational member has a substantially cylindrical large-diameter portion exposed to the outside of the outer housing, and a substantially cylindrical small-diameter portion having a smaller diameter than a diameter of the large-diameter portion, the small-diameter portion projecting from an end surface on an opposite side to the installation surface of the large-diameter portion, the outer housing has a rotation support portion which supports the rotational member; and the rotation support portion has an insertion concavity that is concave toward an inside of the outer housing in the shift direction of the foot main body as a portion into which the small-diameter portion is inserted.

5. The projector according to claim 1, further comprising:

a restricting portion on an upper end side of the foot main body, and a plurality of screw grooves on a lower end side of the foot main body, wherein the rotation restricting member contacts the restricting portion.

6. An electric device comprising:

an outer housing which forms an external case; and a foot brought into contact with an installation surface when the electric device is placed on the installation surface, wherein the foot includes a foot main body which contacts the installation surface, and a rotational member supported rotatably with respect to the outer housing in such a condition that at least a part of the rotational member is exposed to an outside of the outer housing, the foot main body engages with the rotational member and shifts in a direction along a rotation axis of the rotational member in accordance with rotation of the rotational member, and a rotation restricting member, disposed inside the outer housing, restricts rotation of the foot main body.

7. The electric device according to claim 6, wherein the outer housing has a notch extending to side surfaces disposed adjacent to each other; and the rotational member is exposed to the outside of the outer housing through the notch.

8. The electric device according to claim 6, wherein the rotational member has a substantially cylindrical large-diameter portion exposed to the outside of the outer housing, and a substantially cylindrical small-diameter portion having a smaller diameter than a diameter of the large-diameter portion, the small-diameter portion projecting from an end surface on an opposite side to the installation surface of the large-diameter portion, the outer housing has a rotation support portion which supports the rotational member; and the rotation support portion has an insertion concavity that is concave toward an inside of the outer housing in the shift direction of the foot main body as a portion into which the small-diameter portion is inserted.

9. An image display device comprising:

an outer housing which forms an external case; and a foot brought into contact with an installation surface when the image display device is placed on the installation surface, wherein the foot includes a foot main body which contacts the installation surface, and a rotational member supported rotatably with respect to the outer housing in such a condition that at least a part of the rotational member is exposed to an outside of the outer housing, the foot main body engages with the rotational member and shifts in a direction along a rotation axis of the rotational member in accordance with rotation of the rotational member, and a rotation restricting member, disposed inside the outer housing, restricts rotation of the foot main body.

10. A foot structure of a device comprising:

a foot brought into contact with an installation surface when the device is placed on the installation surface, wherein the foot includes a foot main body which contacts the installation surface, and a rotational member supported rotatably with respect to an outer housing of the device in such a condition that at least a part of the rotational member is exposed to an outside of the outer housing, the foot main body engages with the rotational member and shifts in a direction along a rotation axis of the rotational member in accordance with rotation of the rotational member, and a rotation restricting member, disposed inside the outer housing, restricts rotation of the foot main body.

* * * * *